United States Patent

Wrue et al.

[11] Patent Number: 5,972,249
[45] Date of Patent: Oct. 26, 1999

[54] METHOD AND APPARATUS FOR CURING CONTACT LENSES

[75] Inventors: Richard J. Wrue, Rochester, N.Y.; Brian John Scobie, West Lothian, United Kingdom

[73] Assignee: Bausch & Lomb Incorporated, Rochester, N.Y.

[21] Appl. No.: 09/178,659

[22] Filed: Oct. 26, 1998

[51] Int. Cl.[6] .................................................. B29D 11/00

[52] U.S. Cl. ........................................ 264/1.1; 425/808

[58] Field of Search ................................ 264/1.1, 1.36, 264/1.38, 2.5; 425/808

[56] References Cited

U.S. PATENT DOCUMENTS

| | | | |
|---|---|---|---|
| 2,169,404 | 8/1939 | Buttner | 425/808 |
| 3,871,803 | 3/1975 | Beattie | 425/808 |
| 4,252,753 | 2/1981 | Rips | 264/1.1 |
| 5,143,660 | 9/1992 | Hamilton et al. . | |
| 5,271,875 | 12/1993 | Appleton et al. | 264/2.3 |
| 5,470,892 | 11/1995 | Gupta et al. | 264/1.38 |
| 5,516,468 | 5/1996 | Lipscomb et al. | 264/1.38 |
| 5,597,519 | 1/1997 | Martin et al. | 264/1.38 |

*Primary Examiner*—Mathieu D. Vargot
*Attorney, Agent, or Firm*—John E. Thomas

[57] ABSTRACT

A method and apparatus for curing lenses involves supporting mold assemblies containing lens-forming mixture on plates, where the plates are stacked vertically with sufficient clearance to separate adjacent plates of mold assemblies.

8 Claims, 2 Drawing Sheets

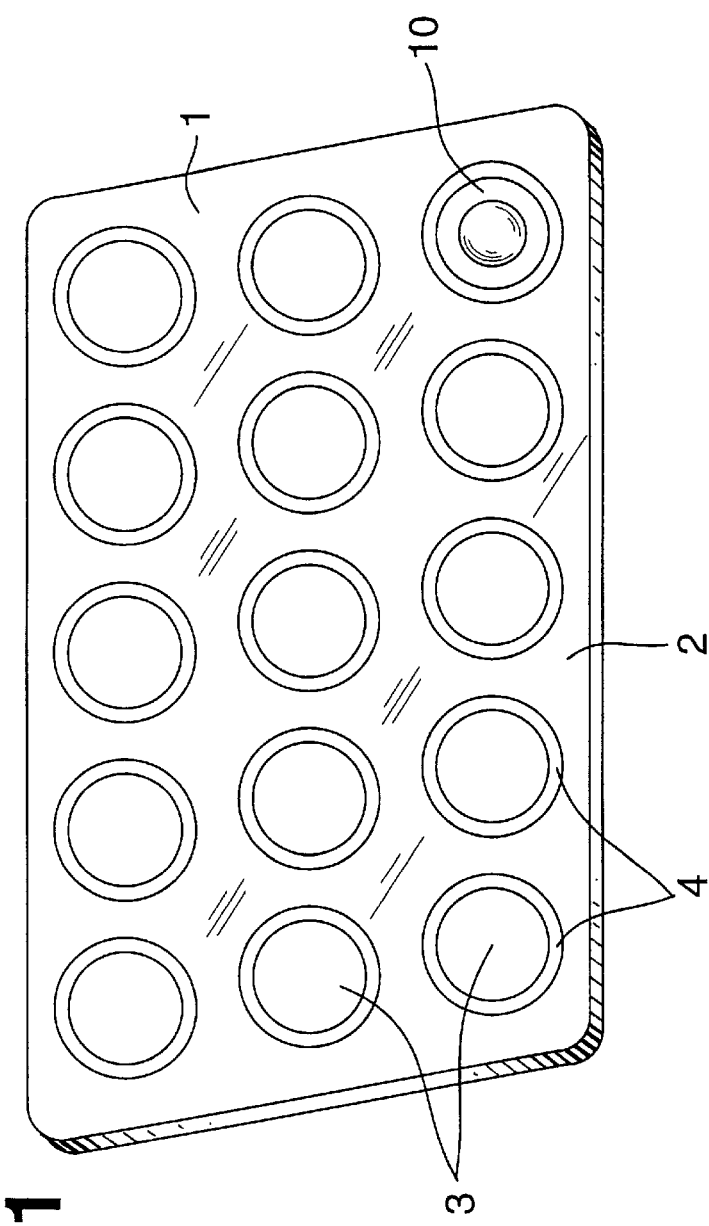
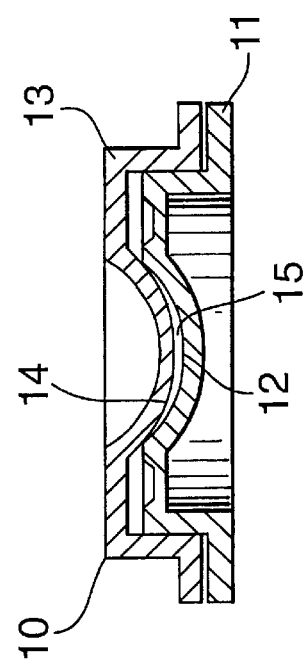

5,972,249

METHOD AND APPARATUS FOR CURING CONTACT LENSES

BACKGROUND OF THE INVENTION

This invention relates to a method and apparatus providing for improved curing of lenses, especially heat curing of contact lenses.

Known methods for casting contact lenses include methods referred to in the art as static cast molding. Such methods involve charging a lens-forming monomer mixture to a two-part mold assembly, the assembly including a posterior mold for forming the posterior contact lens surface and an anterior mold for forming the anterior contact lens surface with a mold cavity defined between these two mold surfaces. Then, the monomer mixture is cured while in the mold assembly, and subsequently, the contact lens is recovered from the mold assembly. A common manner of curing the monomer mixture involves heat curing, where the monomer mixture is exposed to heat while in the mold cavity of the mold assembly to effect polymerization of the monomers in the lens-forming mixture. As an example, U.S. Pat. No. 5,143,660 describes a method for cast molding contact lenses in a two-part mold where the molds including the lens-forming mixture are charged to an oven for heat curing the lens-forming mixture in the mold assemblies.

Where it is desired to heat cure the lens-forming monomer mixture, the molds may be supplied to a heating apparatus such as an oven. Often the heat-cure process will be a batch or semi-batch process, in which case it may be desirable to cure multiple lenses concurrently. One approach to increasing the number of lenses that can be heat cured concurrently is to stack the molds in the heating apparatus, for example, a plurality of two-part molds, each containing monomer mixture, can be arranged on a plate, and then multiple plates can be stacked vertically one on top of the other. However, stacking of the plates on top of one another may lead to different external pressures being applied to different molds in the stacked arrangement, for example, molds in the lower portion of the stack receive greater weight than molds in the upper portion of the stack. Additionally, such stacking also results in different temperature profiles among the various molds. Ultimately, this affects consistency of the casting operation, for example, inconsistent dimensions or curing of the lenses.

The present invention solves this problem by providing a method and an apparatus that avoids uneven weight distribution on stacks of mold parts during curing of monomer mixture contained in the molds. The invention also provides for more even heat distribution among the various stacked molds in the heating apparatus.

SUMMARY OF THE INVENTION

This invention provides a method for curing lenses in a mold assembly, especially contact lenses, comprises placing mold assemblies each containing lens-forming mixture on plates, stacking vertically the plates of mold assemblies in a rack, wherein each plate of mold assemblies is spaced and separated from an adjacent plate of mold assemblies, and curing the lens-forming mixtures in the mold assemblies to form a contact lens. The rack preferably comprises opposed side panels connected at upper ends thereof with a top panel and at lower ends thereof with a bottom panel. Additionally, the side panels may include apertures therethrough to permit circulation of heat among the mold assemblies contained in the rack. The interior surfaces of the opposed side panels include projections for supporting the plates of mold assemblies thereon.

BRIEF DESCRIPTION OF THE DRAWINGS FIGURES

FIG. 1 is a top perspective view of a plate used to hold a plurality of contact lens molds;

FIG. 2 is a cross-sectional view of a representative two-part contact lens mold;

DETAILED DESCRIPTION OF PREFERRED EMBODIMENTS

Figure 3:
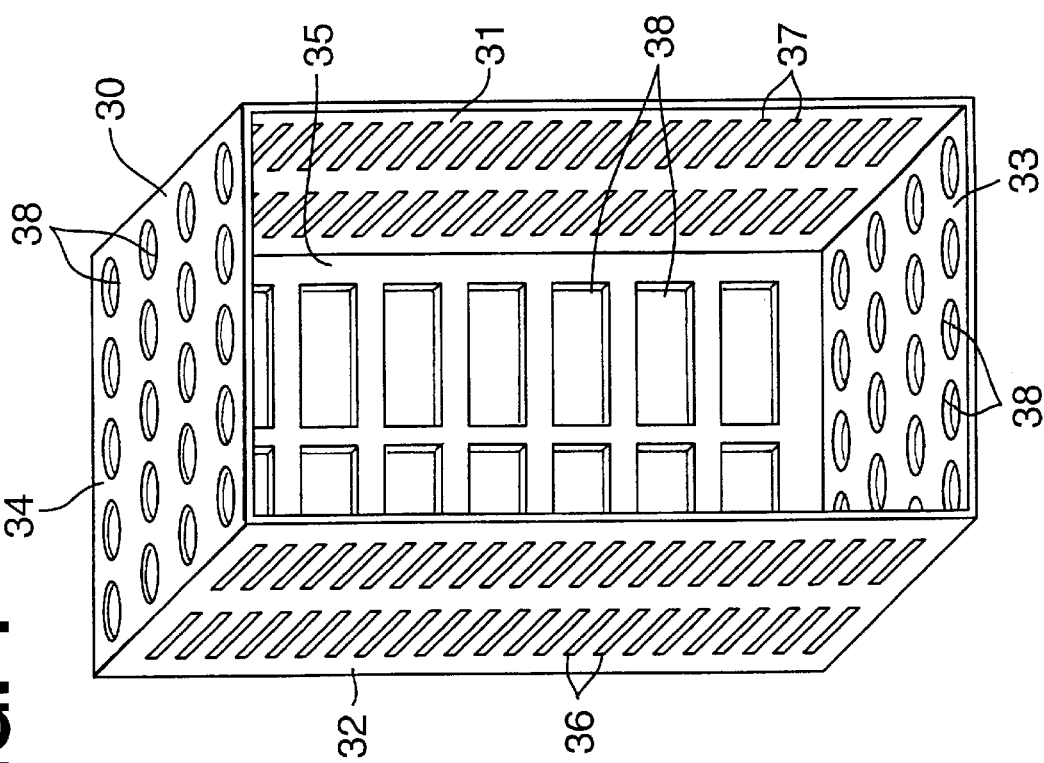
FIG. 3 is a front view of a rack with plural plates of FIG. 1 stacked and inserted therein.

Referring to FIG. 1, plate 1 is designed to hold a predetermined number of contact lens mold assemblies 10, for example, fifteen mold parts for the illustrated embodiment. However, it is understood that the plates can hold any number of molds. Plate 1 includes a planar surface 2 with apertures 3 therein, including recessed portions 4 surrounding each aperture for retaining the molds in position on the plate. Each mold assembly 10, as shown in FIG. 2, is a two-part mold assembly composed of an anterior mold part 11 having a molding surface 12 for forming the anterior surface of a lens and a posterior mold part 13 having a molding surface 14 for forming the posterior surface of a lens. In other words, the space 15 between the anterior and posterior molding surfaces 12,14 forms a molding cavity where monomer mixture, used to cast the lens, is deposited prior to assembling the mold parts as configured in FIGS. 1 and 2. Plate 1 may be constructed of a metal such as stainless steel or anodized aluminum, and is preferably reusable. The molds of mold assembly 10 will generally be constructed of plastic, and frequently in cast molding of contact lenses, the molds are used to cast a single lens and then are discarded.

Figure 4:
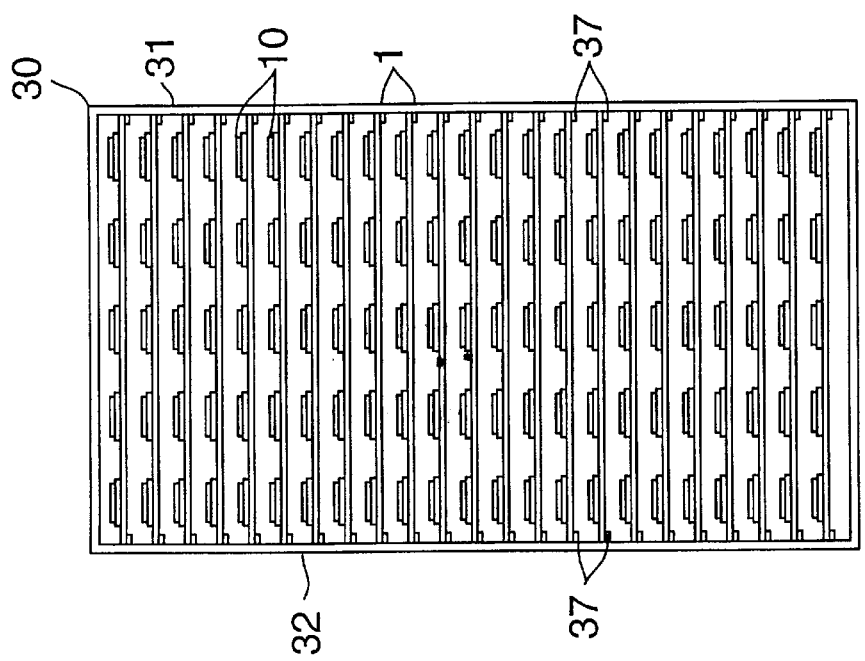
FIG. 4 is a front perspective view of the rack of FIG. 3.

Referring to FIGS. 3 and 4, rack 30 is designed to receive a predetermined number of plates 1 loaded with mold assemblies 10. For the illustrated embodiment, rack 30 has a box-like shape, including two side panels 31, 32, a bottom panel 33, a top panel 34, and a back panel 35. For the illustrated embodiment, the front of the rack is left open so that plates 1 can be inserted and removed from the rack front. If desired, the back of the rack may also be left open, for example, in the case where it is desired to load plates from the front of the rack and remove plates via the back of the rack. Plates 1, containing mold assemblies, may be loaded into the rack manually or via an automated handling device. Each panel may be constructed of a metal such as stainless steel or anodized aluminum, and the rack is preferably reusable.

Side panels 31,32 include apertures 36, with the interiors of the side panels including protrusions 37 extending above these apertures. Protrusions 37 are designed to accommodate and support plates 1. As shown in FIG. 3, the protrusions on side panel 31 are aligned with the protrusions on side panel 32. Additionally, the protrusions are spaced vertically so that there is a vertical clearance between the stacked plates loaded with mold assemblies. Bottom panel 33, top panel 34 and back panel 35 may also include apertures 38. The apertures in the various panels help to ensure that heat from the heating apparatus, in which rack 30 is loaded to heat cure contact lenses in the mold assemblies, may circulate freely among the plates and mold assemblies retained in rack 30.

Following curing of the lens-forming mixture in the mold assemblies, the rack may be removed from the curing oven and plates 1 can be removed from the rack. Alternately, the rack may be an integral portion of the curing oven, such that plates 1 are removed from the rack and oven assembly. Then, lenses are recovered from the mold assemblies for further processing. For example, in the case of soft hydrogel contact lenses, the cured lenses are typically hydrated and packaged.

Many other modifications and variations of the present invention are possible to the skilled practitioner. For example, the invention is applicable to other mold assemblies than those shown in FIG. 2. It is therefore understood that, within the scope of the claims, the present invention can be practiced other than the specifically described embodiments.

We claim:

1. A method for curing lenses in mold assemblies comprising:

placing mold assemblies each containing a lens-forming mixture on plates;

stacking vertically the plates of the mold assemblies in a rack, wherein each plate of mold assemblies is spaced and separated from an adjacent plate of mold assemblies; and curing the lens-forming mixtures in the mold assemblies to form a contact lens.

2. The method of claim 1, wherein the rack comprises opposed side panels connected at upper ends thereof with a top panel and at lower ends thereof with a bottom panel.

3. The method of claim 2, wherein the side panels include apertures therethrough.

4. The method of claim 3, wherein interior surfaces of the opposed side panels comprise projections for supporting plates thereon.

5. The method of claim 1, wherein the lens-forming mixture is cured to form a contact lens by exposure to heat.

6. The method of claim 1, wherein each mold assembly comprises an anterior mold part including a molding surface for forming an anterior contact lens surface and a posterior mold part including a molding surface for forming a posterior contact lens surface.

7. The method of claim 1, wherein the rack comprises opposed side panels, and each plate is supported by vertically spaced protrusions on the side panels.

8. The method of claim 1, wherein the lens-forming mixtures are cured in a curing oven.

\* \* \* \* \*